US011819037B2

(12) United States Patent
Stooker et al.

(10) Patent No.: US 11,819,037 B2
(45) Date of Patent: Nov. 21, 2023

(54) SYSTEM AND METHOD FOR DEBONING A POULTRY LEG PART

(71) Applicant: Foodmate B.V., Numansdorp (NL)

(72) Inventors: Dirk Cornelis Stooker, 's-Gravendeel (NL); Juul Floris Van Den Berg, Roosendaal (NL); David Scott Hazenbroek, Klaaswaal (NL)

(73) Assignee: Foodmate B.V., Numansdorp (NL)

( * ) Notice: Subject to any disclaimer, the term of this patent is extended or adjusted under 35 U.S.C. 154(b) by 200 days.

(21) Appl. No.: 17/426,699

(22) PCT Filed: Feb. 10, 2020

(86) PCT No.: PCT/NL2020/050072
§ 371 (c)(1),
(2) Date: Jul. 29, 2021

(87) PCT Pub. No.: WO2020/162757
PCT Pub. Date: Aug. 13, 2020

(65) Prior Publication Data
US 2022/0095633 A1    Mar. 31, 2022

(30) Foreign Application Priority Data

Feb. 8, 2019   (NL) ..................................... 2022550

(51) Int. Cl.
*A22C 21/00*   (2006.01)
(52) U.S. Cl.
CPC ...... *A22C 21/0076* (2013.01); *A22C 21/0007* (2013.01); *A22C 21/0053* (2013.01)
(58) Field of Classification Search
CPC ............ A22C 21/0076; A22C 21/0007; A22C 21/0053

(Continued)

(56) References Cited

U.S. PATENT DOCUMENTS 5,194,035 A * 3/1993 Dillard ............... A22C 21/0046
452/160
5,976,004 A * 11/1999 Hazenbroek ....... A22C 21/0076
452/136

(Continued)

FOREIGN PATENT DOCUMENTS

CN       1368009 A    9/2002
CN     102858181 A    1/2013

(Continued)

OTHER PUBLICATIONS

International Search Report dated Aug. 10, 2020.

*Primary Examiner* — Richard T Price, Jr.
(74) *Attorney, Agent, or Firm* — WOMBLE BOND DICKINSON (US) LLP (57) ABSTRACT

A system and method for deboning a poultry leg part, including at least one bone and meat surrounding the bone. The system includes a conveying unit arranged for transporting the poultry leg part along a conveying path. The system also includes a deboning unit. The deboning unit includes a gripper arranged for gripping the meat surrounding the bone, the gripper being associated with a first carrier; a gripper actuator arranged for opening and closing the gripper, the gripper actuator being associated with a second carrier; and a gripper tensioner arranged for providing a biasing force for closing the gripper, the gripper tensioner being associated with a third carrier. The first, second and third carriers are arranged for displacement relative to a base member, and the base member is arranged for being transported in horizontal direction along the conveying path.

27 Claims, 5 Drawing Sheets

(58) Field of Classification Search
USPC .......................................................... 452/135
See application file for complete search history.

(56) References Cited

U.S. PATENT DOCUMENTS

| | | | |
|---|---|---|---|
| 7,059,954 | B2 | 6/2006 | Annema et al. |
| 8,961,274 | B1 * | 2/2015 | den Boer ........... A22C 21/0076 452/148 |
| 2002/0102932 | A1 | 8/2002 | Minemura et al. |
| 2012/0315834 | A1 | 12/2012 | Van Der Steen et al. |
| 2015/0272140 | A1 | 10/2015 | Peters et al. |
| 2017/0006883 | A1 | 1/2017 | Ebbers et al. |
| 2017/0127692 | A1 | 5/2017 | Annema et al. |

FOREIGN PATENT DOCUMENTS

| | | |
|---|---|---|
| CN | 105120672 A | 12/2015 |
| CN | 204907700 U | 12/2015 |
| CN | 106163288 A | 11/2016 |
| CN | 106659173 A | 5/2017 |
| CN | 109090194 A | 12/2018 |
| KR | 10-2018-0038299 | 4/2018 |
| WO | WO2014163489 A | 10/2014 |
| WO | WO 2018/143799 A1 | 8/2018 |

\* cited by examiner

SYSTEM AND METHOD FOR DEBONING A POULTRY LEG PART

FIELD OF THE INVENTION

The present invention relates to a method and a system for deboning a poultry leg or leg part. More particularly the invention relates to a method and a system for deboning a poultry thigh.

BACKGROUND TO THE INVENTION

It is known to automatically harvest meat from poultry legs or leg parts. Generally, the meat is stripped from the bone by mechanical means such as grippers or diaphragms. These grippers or diaphragms can be linearly moved for the stripping process.

However, accuracy of movement of the grippers or diaphragms and accuracy of a force applied to the bone can be difficult to achieve. If a gripper grips the meat too firmly, the risk of shattering the bone arises. If a gripper grips the meat too weakly, the risk of incomplete meat harvest arises.

Accordingly, there still exists a need to improve the known leg deboning methods to allow the automatic processing steps to be performed more reliably, and with higher yield of the meat products harvested from slaughtered poultry.

SUMMARY OF THE INVENTION

Accordingly, it is an object of the present invention to propose an improved system and method for harvesting meat from poultry legs or leg parts. In a more general sense it is an object of the invention to overcome or reduce at least one of the disadvantages of the prior art.

According to an aspect is provided a system for deboning a poultry leg part, including at least one bone and meat surrounding the bone. The leg part can include a thigh and a drumstick. It is also possible that the leg part is a thigh or a drumstick.

The system includes a conveying unit arranged for suspending the poultry leg part therefrom, and for transporting the poultry leg part along a conveying path. The conveying unit can be an overhead conveying unit. The conveying unit can be a conveying chain. The conveying unit can include one or more shackles for suspending the poultry leg parts therefrom. The poultry leg can e.g. be suspended from the shackle by the ankle joint.

The system also includes a deboning unit. The deboning unit includes a gripper arranged for gripping the meat surrounding the bone, the gripper being associated with a first carrier. The deboning unit includes a gripper actuator arranged for opening and closing the gripper, the gripper actuator being associated with a second carrier. The deboning unit includes a gripper tensioner arranged for providing a biasing force for closing the gripper, the gripper tensioner being associated with a third carrier. The first, second and third carrier are arranged for vertical displacement relative to a base member. The base member is arranged for being transported in horizontal direction along the conveying path. The gripper can be opened for gripping the leg part around the bone, e.g. at or near the knee joint. The gripper can be closed for pulling the meat off the bone. The gripper actuator actuates the opening and closing of the gripper. The gripper tensioner can selectively provide a biasing force for closing the gripper. Hence, the highly flexible system is provided with which the gripper can be closed selectively with a biasing force or without a biasing force. Also, a magnitude of the biasing force closing the gripper can be adjusted by movement of the third carrier relative to the first carrier.

Optionally, the base member includes a linear guide for guiding the first, second and third carrier in the vertical direction. The linear guide can e.g. include two guide bars. Hence, the first, second and third carrier can easily be independently displaced vertically while being transported synchronously in horizontal direction along the conveying path. The base member can be part of an endless belt, preferably moving in synchronization with the conveying unit.

Optionally, the deboning unit includes a first guide and the first carrier includes a first follower for following the first guide. Optionally, the deboning unit includes a second guide and the second carrier includes a second follower for following the second guide. Optionally, the deboning unit includes a third guide and the third carrier includes a third follower for following the third guide. By providing an individual guide for each of the carriers, mutual movement of the carriers can be achieved easily and efficiently. Optionally, the first, second and third guides are stationary. Hence, the guides can easily be provided.

Optionally, the first guide is a first guide channel, and/or the second guide is a second guide channel, and/or the third guide is a third guide channel.

Optionally, the deboning system includes a guiding plate including at least a portion of the first, second and/or third guide channel. Preferably, at least a portion of the first, second and third guide channel are provided as cutouts in the guiding plate. Preferably, a plurality of guiding plates is provided, together forming the first, second, and third guide channels. Hence, in a simple manner the first second and third guides can be provided. Also, by replacing one or more of the guiding plates, the operation of the deboning system can easily be altered. The first, second and/or third guide channel can also be provided as guide channel sections, such as formed by a u-shaped profile, or a one or more guiding strips.

Optionally, the gripper includes a first jaw and second jaw, rotatable relative to each other and mounted to the first carrier. The first jaw and/or the second jaw can include a cutout for allowing the jaws to fully close around the bone while not damaging the bone. Preferably, both the first jaw and the second jaw are rotatably mounted to the first carrier. It is possible that the first and the second jaw have a common rotation axis.

Optionally, the gripper actuator includes a first arm connecting the rotatable first jaw to the second carrier, such that a relative displacement of the second carrier relative to the first carrier rotates the first jaw. The first arm can be arranged such that when the second carrier moves closer to the first carrier, the first jaw is rotated towards a closed position. Preferably, the gripper actuator includes a second arm connecting the rotatable second jaw to the second carrier, such that a relative displacement of the second carrier relative to the first carrier rotates the second jaw. The second arm can be arranged such that when the second carrier moves closer to the first carrier, the second jaw is rotated towards a closed position. It is also possible that the first jaw is coupled to the second jaw such that actuation of the first jaw to open or close is transferred from the first jaw to the second jaw. The first and second jaws can e.g. include meshing gear sections for causing the jaws to rotate synchronously.

Optionally, a resilient member, such as a spring, is interposed between the second carrier and the third carrier. The resilient member can be arranged for forcing the second carrier away from the third carrier. Alternatively, the resilient member can be arranged for forcing the second carrier towards the third carrier. Hence the biasing force can be controlled by controlling a distance between the first and the third carriers.

Optionally, the system is arranged such that in a first mode the gripper is in an opened state, and in a second mode the gripper is biased in a closed position. In the second mode, the resilient member can bias the second carrier to actuate the gripper to close. The resilient member can bias the second carrier towards the first carrier for closing the gripper. In the second mode, the biasing force of the resilient member is on the one hand supported by the third guide and on the other hand supported by the gripper (or the leg held by the gripper). Optionally, the system is arranged such that in a third mode the gripper is forced in a closed position. In the third mode, the biasing force of the resilient member is not applied to the gripper. Instead, the second carrier forces the gripper to close.

Optionally, the second guide channel includes at least one section wherein the second follower is guided with play allowing the second carrier to vertically move relative to the first and third carriers. In the second mode, the play allows the second carrier to move relative to the first and third carriers for transferring the biasing force from the third carrier to the gripper.

According to an aspect is provided a system for processing poultry legs. The system includes a conveying system arranged for suspending the poultry leg part therefrom. The system includes a measurement system arranged for measuring a length of each poultry leg suspended from the conveying system. The system includes a precutting system arranged for cutting meat and including a height adjustment unit for adjusting a height of the poultry leg relative to a cutting device precutting system, e.g. based on a measurement performed by the measurement system. The system includes a deboning system as described hereinabove. The precutting allows easy and efficient deboning. The height adjustment unit allows accurate precutting.

According to an aspect is provided a method for deboning a poultry leg part, including at least one bone and meat surrounding the bone. The method includes transporting the suspended poultry leg part along a conveying path. The method also includes gripping the meat surrounding the bone, with a gripper associated with a first carrier. The method also includes actuating closing of the gripper around the leg part by moving a gripper actuator associated with a second carrier relative to the first carrier. The method also includes determining a biasing force for closing the gripper by a gripper tensioner associated with a third carrier by moving the third carrier relative to the first carrier. Hence, the highly flexible method is provided with which the gripper can be closed selectively with a biasing force or without a biasing force. Also, a magnitude of the biasing force closing the gripper can be adjusted by movement of the third carrier relative to the first carrier.

Optionally, the first, second and third carrier are arranged for vertical displacement relative to a base member, and the base member is arranged for being transported in horizontal direction along the conveying path. Hence a simple structure can be used.

Optionally, the method includes moving the first carrier by having a first follower of the first carrier follow a first guide, moving the second carrier by having a second follower of the second carrier follow a second guide, and moving the third carrier by having a third follower of the third carrier follow a third guide. Hence movement of the carriers is easily achieved. Optionally, the first, second and third guides are stationary.

Optionally, the method includes closing the gripper by moving the second carrier towards the first carrier.

Optionally, determining the biasing force includes including a resilient member, such as a spring, between the second carrier and the third carrier. Hence the biasing force can be provided in a simple manner.

Optionally, the method includes biasing the second carrier to actuate the gripper to close. Hence the gripper can be closed with a biasing force. Optionally, a biasing force of the resilient member is on the one hand supported by the third guide and on the other hand supported by the gripper, or the leg held by the gripper. Thus, the biasing force is efficiently applied for closing the gripper.

Optionally, the method includes allowing the second carrier to freely move relative to the first and third carriers for transferring the biasing force from the third carrier to the gripper. Hence, the biasing force is simply transferred to the gripper.

Optionally, the method includes forcing the gripper in a closed position. Hence, instead of biasing the gripper to close, the gripper can be firmly closed wherein the biasing force of the resilient member is not applied to the gripper.

Optionally, the method includes, prior to gripping the meat surrounding the bone, precutting the meat surrounding the bone to provide a cut at or near the gripping location. Hence, the deboning can be performed easier and more efficiently. Optionally, the method includes prior to precutting the meat, adjusting a height of the poultry leg part relative to a cutting device used for precutting the meat. Hence, the precutting can be performed at a precise location relative to the anatomy of the poultry leg part, e.g. at or near a knee joint. Optionally, the method includes measuring a length of the poultry leg part for allowing adjusting the height. For instance a length of the entire leg part can be measured, or e.g. a length from the shackle to the knee joint.

As described above, the system for processing poultry legs can include a precutting system. It has been found that such precutting systems can be improved as well. Therefore, as a subject separate from the deboning system and method herein is also described an improved precutting system and method.

Hence, can be provided a system for pre-cutting a poultry leg part, including a femur and a tibia and meat surrounding the bones. The system includes a conveying unit including at least one shackle arranged for suspending the poultry leg part therefrom from the ankle joint, and for transporting the poultry leg part along a conveying path. The system also includes a pre-cutting unit. The pre-cutting unit includes a cutting unit arranged for cutting the meat at or near the knee joint. The cutting unit can be arranged for cutting the meat on one or more sides of the knee, e.g. on two opposite sides. Pre-cutting the meat at or near the knee joint e.g. allows for easier deboning. The precutting unit further includes a grasper arranged for grasping the meat surrounding the femur. The grasper includes two grasping jaws arranged to selectively be in a first or a second position. In the first, open, position, the jaws are spaced apart for receiving or releasing the leg part. In the second, closed, position, the jaws are closed for maintaining the leg part positioned. Hence, the leg can be maintained properly positioned while cut by the cutting unit. The grasping jaws are positioned to grasp the meat surrounding the femur below the knee joint. This allows firm maintaining of the leg part. The grasper is mounted to a grasper conveyor arranged for moving the grasper synchronous with the shackle. Hence, the grasper can be in the open position for receiving the leg part. Then, the grasper is closed and the leg part is moved past the cutting unit for cutting the meat while the grasper is maintained in the closed position. Next, the grasper can be opened again for releasing the leg part.

Optionally, the grasping jaws each include a grasping bar. The grasping bar can efficiently maintain the leg part in position. Optionally, the bars are substantially parallel in the second position. Hence, a size of the leg part hardly influences the capability of the grasper of maintaining the leg part in position. Also, this way the grasper does not force the leg part to a certain position, but allows the leg part to hang naturally from the shackle. Optionally, in the second position the grasping bars are in a non-horizontal position, being lower at the front side of the leg than at the rear side of the leg. The inclined grasping bars allow for efficient grasping of the thigh meat, taking into account the general distribution of meat around the femur.

Optionally, the pre-cutting system further includes a rotation station arranged for synchronously rotating both the shackle and the grasper. The synchronous rotation ensures that the leg part is maintained in a proper position relative to the shackle. It will be appreciated that here synchronous rotation allows for a minor phase difference between the rotation of the shackle and the rotation of the grasper, e.g. not exceeding 15 degrees of rotation at any time during rotation, preferably not exceeding 10 degrees. The rotation station may be followed by a second cutting unit for making a second cut or second cuts, e.g. at 90 degrees relative to the cut(s) made by the earlier cutting unit.

Also is provided a method for pre-cutting a poultry leg part, including a femur and a tibia and meat surrounding the bones. The method includes suspending the leg parts from shackles of a conveying unit. The meat surrounding the femur is grasped by a grasper including two grasping jaws. First, the grasper is in the open position for receiving the leg part. Then, the grasper is closed and the leg part is moved past the cutting unit for cutting the meat while the grasper is maintained in the closed position. Herein the grasper is moved synchronously with the shackle. Next, the grasper can be opened again for releasing the leg part.

It will be appreciated that all features and options mentioned in view of the system apply equally to the method and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1:
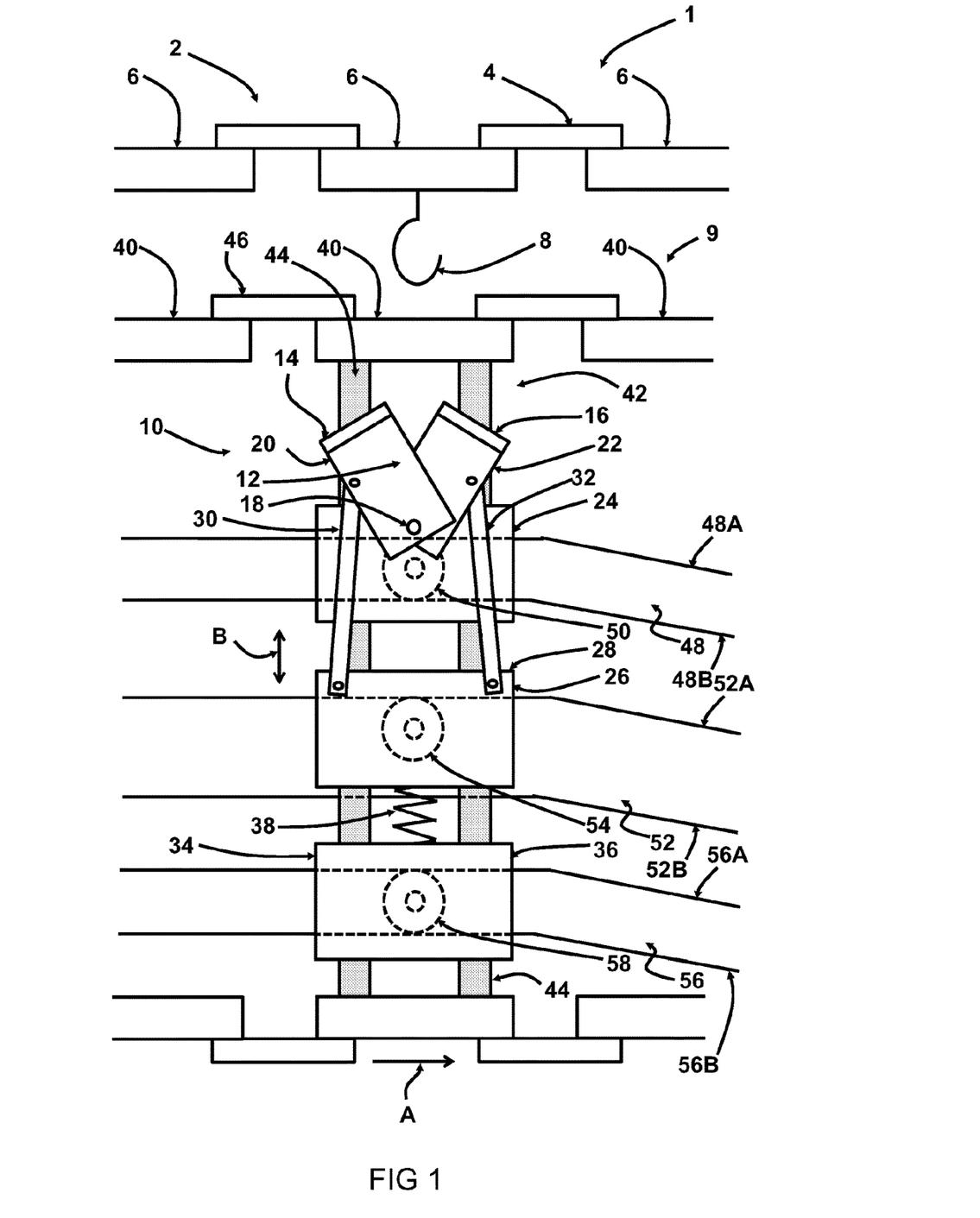
FIG. 1 is schematic representation of a deboning system.

FIG. 1 shows a schematic representation of a system 1 for deboning a poultry leg part, in particular for leg parts including at least one bone and meat surrounding the bone, such as poultry legs including a thigh and a drumstick, or poultry a thighs, or poultry drumsticks.

The system 1 includes a conveying unit 2 arranged for suspending the poultry leg part therefrom, and for transporting the poultry leg part along a conveying path in a conveying direction A. In this example, the conveying unit 2 is an overhead conveying unit. Here the conveying unit 2 is a conveying chain 4. The conveying unit 2 includes a plurality of shackles 6 for suspending the poultry leg parts therefrom. The poultry leg can e.g. be suspended from a hook 8 of the shackle 6, e.g. by the ankle joint of the leg.

The system 1 also includes a deboning system 9 including one or more deboning units 10. The deboning unit 10 includes a gripper 12 arranged for gripping the meat surrounding the bone. Here the gripper 12 includes a first jaw 14 and second jaw 16. Here, the jaws 14, 16 are rotatable relative to each other around a pivot axle 18. In this example, the first jaw 14 includes a first jaw plate 20 connecting the jaw 14 to the pivot axle 18. In this example, the second jaw 16 includes a first jaw plate 22 connecting the jaw 16 to the pivot axle 18. The first and second jaws 14, 16 are mounted to a first carrier 24 via the pivot axle 18. Hence, the gripper 12 is mounted on the first carrier 24. The first jaw 14 and/or the second jaw 16 can include a cutout for allowing the jaws to fully close around the bone while not damaging the bone.

The deboning unit 10 includes a gripper actuator 26 arranged for opening and closing the gripper 12. The gripper actuator 26 is associated with a second carrier 28. In this example, the gripper actuator 26 includes a first arm 30 connecting the rotatable first jaw 14 to the second carrier 28. In this example, the gripper actuator 26 also includes a second arm 32 connecting the rotatable second jaw 16 to the second carrier 28. The first arm 30 is pivotally connected to the first jaw 14 and pivotally connected to the second carrier 28. The second arm 32 is pivotally connected to the second jaw 16 and pivotally connected to the second carrier 28. It will be clear that a relative displacement of the second carrier 28 relative to the first carrier 24 will rotate the first and second jaws 14, 16 around the pivot axle 18. When the second carrier 28 moves closer to the first carrier 24, the jaws 14, 16 are rotated towards a closed position. It will be appreciated that it is also possible that the first jaw is coupled to the second jaw such that actuation of the first jaw to open or close is transferred from the first jaw to the second jaw. The first and second jaws can e.g. include meshing gear sections for causing the jaws to rotate synchronously. In such case the second arm may be omitted.

The deboning unit 10 includes a gripper tensioner 34 arranged for providing a biasing force for closing the gripper 12. The gripper tensioner 34 is associated with a third carrier 36. In this example, a resilient member 38, such as a spring, is interposed between the second carrier 28 and the third carrier 36. Here, the resilient member 38 is arranged for forcing the second carrier 28 away from the third carrier 36.

In FIG. 1, the first carrier 24, second carrier 28 and third carrier 36 are arranged for vertical displacement relative to a base member 40. In this example, the base member 40 includes a linear guide 42 for guiding the first 24, second 28 and third carrier 36 in the vertical direction B. Here, the linear guide 42 includes two guide bars 44. The carriers 24, 28, 36 can e.g. include slide bearings for sliding along the guide bars 44. The first 24, second 28 and third carrier 36 can thus easily be independently displaced vertically.

The base member 44 is arranged for being transported in horizontal direction A along the conveying path. Thereto the base member can be mounted to or part of, a deboning conveyor 46, such as an endless belt. In this example, the deboning system 9 includes a plurality of deboning units 10 (only the base members 40 of adjacent deboning units drawn partially for clarity) assembled to an endless belt. The deboning conveyor 46 is arranged for moving the deboning units 10 in the conveying direction A synchronous with the conveying unit 2. Hence, a poultry leg suspended from a predetermined shackle 6 will be moved in the conveying direction A, synchronously with an associated deboning unit 10. The first 24, second 28 and third carrier 36 can thus easily be independently displaced vertically, while being transported synchronously in horizontal direction along the conveying path.

In FIG. 1, the deboning system 9 includes a first guide 48 and the first carrier 24 includes a first follower 50 for following the first guide 48. Here, the first guide 48 is a guide channel having upper and lower guiding walls 48A, 48B. Here, the first follower 50 is a first follower wheel rotatable mounted to the first carrier 24. In FIG. 1, the first follower 50 is drawn in ghost because it is attached to the rear of the first carrier 24. It will be appreciated that as the first follower 50 follows the first guide 48, the first carrier can be moved up or down while being transported in the conveying direction A, depending on the local vertical position of the first guide 48. In FIG. 1, the deboning system 9 includes a second guide 52 and the second carrier 28 includes a second follower 54 for following the second guide 52. Here, the second guide 52 is a guide channel having upper and lower guiding walls 52A, 52B. Here, the second follower 54 is a second follower wheel rotatable mounted to the second carrier 28. In FIG. 1, the second follower 54 is drawn in ghost because it is attached to the rear of the second carrier 28. It will be appreciated that as the second follower 54 follows the second guide 52, the second carrier can be moved up or down while being transported in the conveying direction A, depending on the local vertical position of the second guide 54. In FIG. 1, the deboning system 9 includes a third guide 56 and the third carrier 36 includes a third follower 58 for following the third guide 56. Here, the third guide 56 is a guide channel having upper and lower guiding walls 56A, 56B. Here, the third follower 58 is a third follower wheel rotatable mounted to the third carrier 36. In FIG. 1, the third follower 58 is drawn in ghost because it is attached to the rear of the third carrier 36. It will be appreciated that as the third follower 58 follows the third guide 56, the third carrier can be moved up or down while being transported in the conveying direction A, depending on the local vertical position of the third guide 56.

Figure 2:
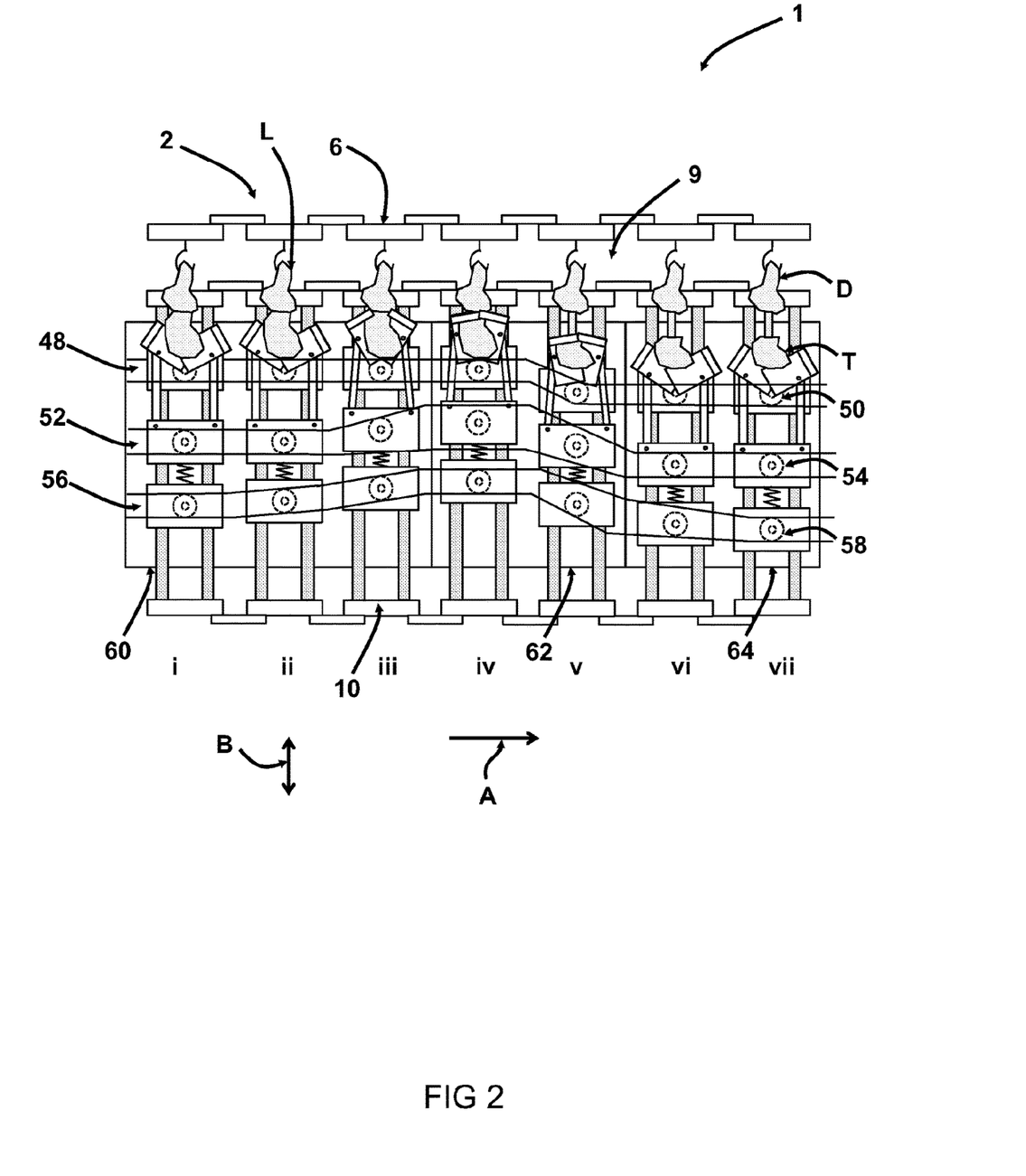
FIG. 2 is a schematic representation of a deboning system.

FIG. 2 shows a schematic representation of the deboning system 1 as described in relation to FIG. 1. In FIG. 2 a plurality of deboning units 10 is shown at incremental positions along the conveying path. In use, the deboning units 10 are transported in the conveying direction A, synchronous with a plurality of shackles 6 of the conveying unit 2. In FIG. 2, a poultry leg L including a drumstick D and a thigh T is suspended from each shackle, by the ankle joint.

In FIG. 2, the deboning units 10 are shown in consecutive positions i-vii along the conveying direction A. It will be appreciated that each individual deboning unit 10 will consecutively pass the positions i-vii while being transported in the conveying direction. The first follower 50 is in the first guide channel 48. The second follower 54 is in the second guide channel 52. The third follower 58 is in the third guide channel 56.

In this example, in position i the leg L is suspended near the gripper 12 while the jaws 14 and 16 are in an opened position. The leg L may be pre-cut near the knee joint for allowing efficient deboning. A height position of the leg L may have been pre-adjusted, e.g. such that the knee joint is aligned with the gripper 12. Thereto, a leg length measurement system may precede deboning system 1, for determining a length of the leg and/or a position of the knee joint. Also a height adjustment system may precede the deboning system 1 for adjusting the height position of the leg. It will be appreciated that the shackle 6 may include means for adjusting a suspension height of the leg L relative to the shackle. The height of the leg L may e.g. be adjusted such that the knee joint of the leg is positioned properly relative to the jaws 14, 16. Here, the resilient member 38 is in a non-biased state at position i, although this is not essential.

Going from position i to position ii, in this example, the third guide channel 56 inclines, i.e. deviates upwards. A distance between the third guide channel 56 and the second guide channel 52 diminishes. As a result, the resilient member 38 is compressed and provides a biasing force from the first carrier 36 onto the second carrier 28. The second follower 54 will be forced against the second guide channel upper wall 52A and the third follower will be forced against the third guide channel lower wall 56B. As no force is applied to the first carrier 24, the first follower 50 may abut against the first guide channel lower wall 48B under gravity.

Going from position ii to position iii, in this example, the second guide channel 52 also inclines. A distance between the second guide channel 52 and the first guide channel 48 diminishes. As a result, the second carrier 28 is moved towards the first carrier 24 and the gripper 12 is closed around the leg L. Here, a distance between the third carrier 36 and the second carrier 28 is maintained, hence the biasing force is maintained.

Going from position iii to position iv, in this example, the second guide channel 52 remains inclining. A distance between the second guide channel 52 and the first guide channel 48 diminishes further. As a result, the second carrier 28 is further moved towards the first carrier 24 and the gripper 12 is closed further around the leg L. It is noted that, in this example, going from position ii to position iv the second guide channel 52 is widened. Therefore, the second follower 54 is contained in the second guide channel with substantial play. At position iv it can be seen that the gripper is fully closed around the bone of the leg L. The play in the second guide channel 52 allows the second follower 54 to be pressed downwardly against the biasing force of the resilient member 38. Hence, the gripper 12 is closed around the leg L with a biasing force provided by the resilient member 38. This allows for variation in bone thickness. This also allows for a forced contact between the jaws 14, 16 and the bone, so as to allow for efficient scraping of the meat of the bone. This also allows for avoiding damaging the bone, as the closing force of the gripper 12 is limited by the resilient member 38.

Going from position iv to position v the first guide channel 48 declines, i.e. deviates downwards. Hence, the first carrier 24 moves downwards. As a result, the gripper 12 that is biased closed around the bone is moved downwards and pulls the meat off the thigh bone. The second guide channel 52 and the third guide channel 54 also decline, allowing the second carrier 28 and the third carrier 36 to move downward as well. Here, the second guide channel 52 is still widened to allow the gripper to remained biased closed.

Going from position v to position vi, in this example, a distance between the second guide channel 52 and the first guide channel is increased such that the gripper 12 is opened again. Going from position vi to position vii, in this example, a distance between the third guide channel and the second guide channel is increased so that the biasing force by the resilient member 38 is removed, or at least reduced.

In the example of FIG. 2, a first guiding plate 60 is provided. The first guiding plate 60 includes portions of the first 48, second 52 and third guide channels 56 associated with positions i to iii. Here, a second guiding plate 62 is provided. The second guiding plate 62 includes portions of the first 48, second 52 and third guide channels 56 associated with positions iv and v. Here, a third guiding plate 64 is provided. The third guiding plate 64 includes portions of the first 48, second 52 and third guide channels 56 associated with positions vi and vii. Hence, the guiding plates 60, 62, 64 together form the first 48, second 52 and third guide channels 56. The guiding plates are positioned stationary. By replacing one or more of the guiding plates, the relative movement of the first 24, second 28 and third carriers 36 can easily be altered. Hence, the operation of the deboning system 1, can easily be altered. Hence, it can be simple to alter the operation of the deboning system 1 to different requirements.

In general, it will be appreciated that in a first mode the gripper is in an open position. In a second mode, the gripper is biased to the closed position. In an optional third mode, the gripper can be forced to the closed position with more force than delivered by the resilient member. The first, second and third mode can be applied at different positions along the conveying direction. In the first mode, a distance between the first and second guides is chosen such that the gripper is maintained in open position. In the first mode, no biasing force is applied to the gripper for closing. The biasing member applies a force between the third carrier and the second carrier. In the first mode, the second guide can be arranged such that the biasing force is absorbed by the second guide. In the second mode, the second guide can be arranged such that the biasing force is not absorbed by the second guide. Instead, then the biasing force is transferred to the gripper for biasing the gripper to a closed position. In the third mode, a distance between the first and second guides is chosen such that the gripper is brought to its closed position. Then, the biasing member does not exert a biasing force to the gripper.

It will be appreciated that in the examples the first and second modes, and optional third mode, can be achieved by proper positioning of boundary surfaces of the second and third, and first, guide channels.

In the above example, the first mode can be achieved if the distance between the first channel lower wall 48B and the second channel upper wall 52A is such that the gripper is forced (e.g. by gravity) to the open position. In that situation it is possible that a distance between the third channel lower wall 56B and the second channel upper wall 52A is such that the resilient member presses the third follower 58 against the third channel lower wall 56B and second follower 54 against the second channel upper wall 52A. Hence, any biasing force will be absorbed by the second guide channel 52. The first mode can also be achieved if the distance between the first channel upper wall 48A and the third channel lower wall 56B is too large for the gripper to be biased to the closed position.

In the above example, the second mode can be achieved if the distance between the first channel upper wall 48A and the third channel lower wall 56B is such that the resilient member 38 is compressed, while at the same time the distance between the first channel upper wall 48A and the second channel lower wall 52B is such that the second follower 54 does not abut the second channel lower wall 52B. It will be appreciated that a magnitude of the biasing force closing the gripper can be selected by adjusting the distance between the first channel upper wall 48A and the third channel lower wall 56B.

In the above example, the third mode can be achieved if the distance between the first channel upper wall 48A and the second channel lower wall 52B is such that the first follower 50 abuts against the first channel upper wall 48A and the second follower 54 abuts against the second channel lower wall 52B while the gripper is in the closed position (e.g. closed against a leg part).

Figure 3:
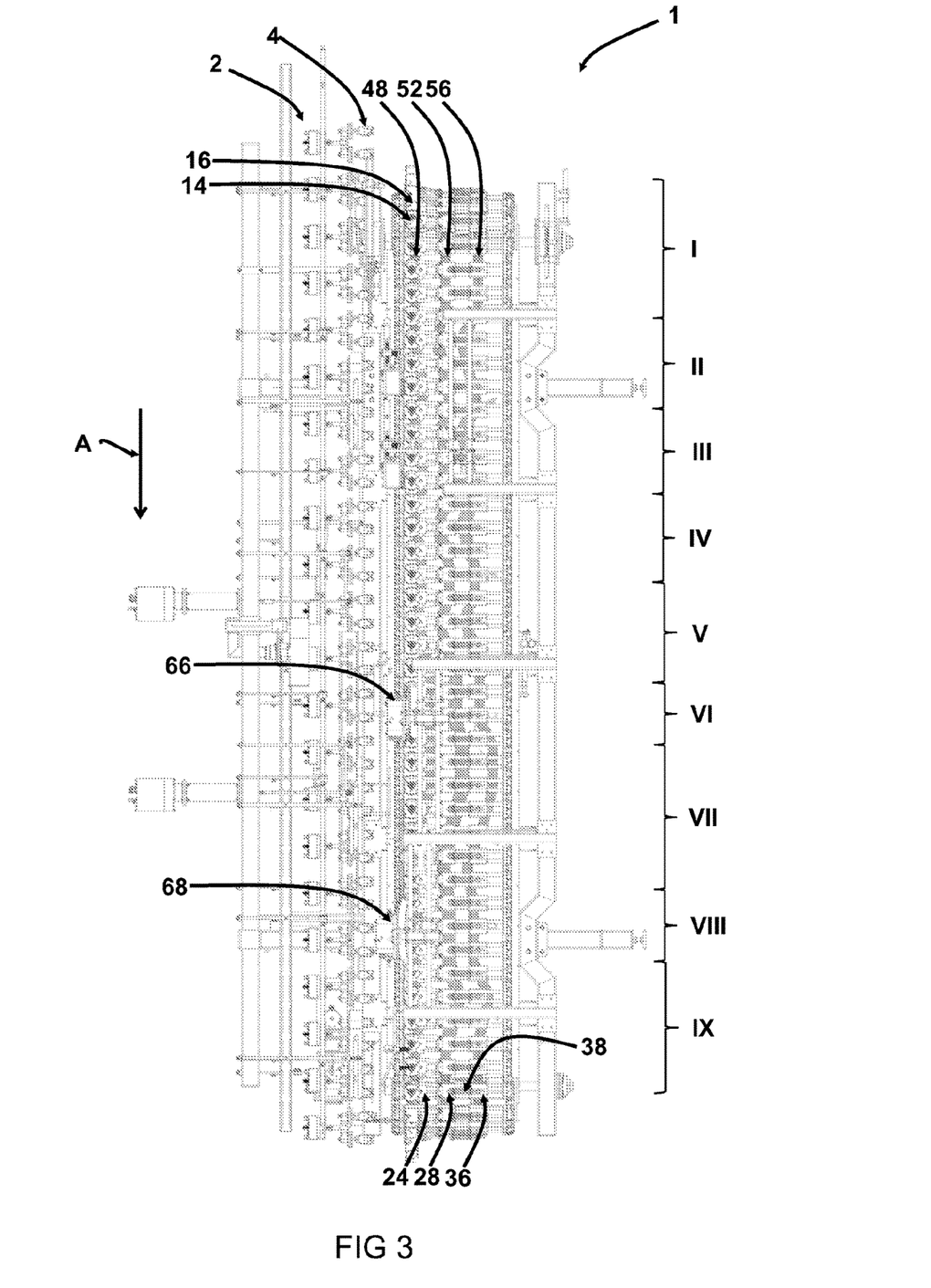
FIG. 3 is a schematic representation of a deboning system.

FIG. 3 shows a schematic representation of an exemplary deboning system 1. FIG. 3 shows a plurality of deboning units 10 as described in view of FIGS. 1 and 2. In this example, a poultry leg L is presented to the deboning system at I. Here, the leg L is presented with incisions around the perimeter of the leg at the height of the knee already made. In stage II, the gripper 12 grips the thigh meat at the knee joint and pulls the meat downwards. In stage III the gripper 12 opens and the leg L is rotated, here about ninety degrees. Then, the gripper 12 is moved upwards, closes again and re-scrapes along the thigh bone. In stage IV the gripper 12 opens, is moved upwards, closes again and re-scrapes along the thigh bone. In stage V the gripper 12 opens again, is moved upwards, closes again and re-scrapes along the thigh bone to below the hip joint and pulls the meat taut. In stage VI a first cutting unit 66 cuts the thigh meat below the hip joint. In stage VII, gripper 12 opens, is moved upwards, closes again and grips the thigh bone and pulls it taut. In stage VIII a second cutting unit 68 cuts the thigh bone from the drumstick. In stage IX the gripper is opened to make sure the thigh bone is ejected.

Figure 4:
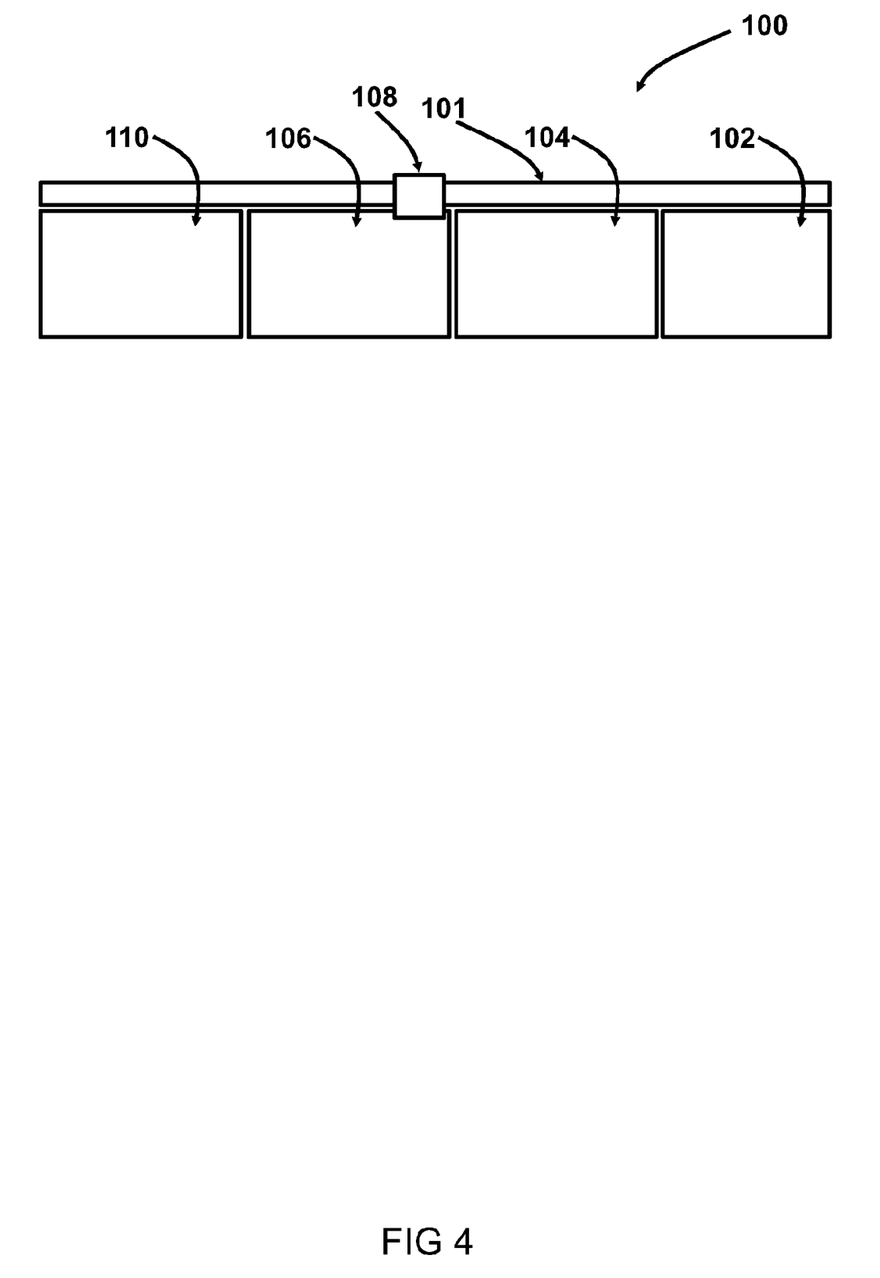
FIG. 4 is a schematic representation of a poultry processing system.

FIG. 4 shows a schematic representation of a system 100 for processing a poultry leg or leg part, such as a leg L including a drumstick and a thigh. The system 100 includes a conveying system 101 arranged for suspending the poultry leg part therefrom, and for transporting the poultry leg part along a conveying path in a conveying direction A. In this example, the poultry legs are suspended from the shackles by the ankle joint. In this example, the conveying system 101 is an overhead conveying system including a plurality of shackles 6. The system 100 includes receiving system 102 arranged for receiving the poultry legs. The poultry legs can be suspended from the shackles manually, or in an automated manner. From the receiving system 102, the conveying system 101 in this example transports the poultry legs to a measurement system 104. The measurement system 104 is arranged for measuring a length of each leg. Here, the measurement system 104 measures a position of the knee joint relative to the shackle. From the measurement system 104, the conveying system in this example transports the poultry legs to a precutting system 106. Here, the precutting system is arranged for cutting meat, and optionally tendons, near the knee joint, for allowing easy scraping meat of the bone. In this example, a height adjustment unit 108 is provided for adjusting a height of the poultry leg relative to a cutting device, such as a knife (e.g. a rotary knife) of the precutting system 106. The height adjustment unit 108 can e.g. adjust the height of the poultry leg such that the knee joint of the leg is at a predetermined height relative to the cutting device, e.g. based on the measurement performed by the measurement system 104. From the precutting system 106, the conveying system in this example transports the poultry legs to a deboning unit 110. The deboning unit 110 can be arranged as the deboning system 1 described hereinabove, such as the deboning system 1 of FIG. 3. The conveying unit 2 of the deboning system can e.g. be part of the conveying system 101. The deboning unit 110 in this example debones the thigh, while leaving the meat on the drumstick bone. It will be appreciated that the deboning unit 110 can also be provided with one or more height adjustment units if needed.

Figure 5:
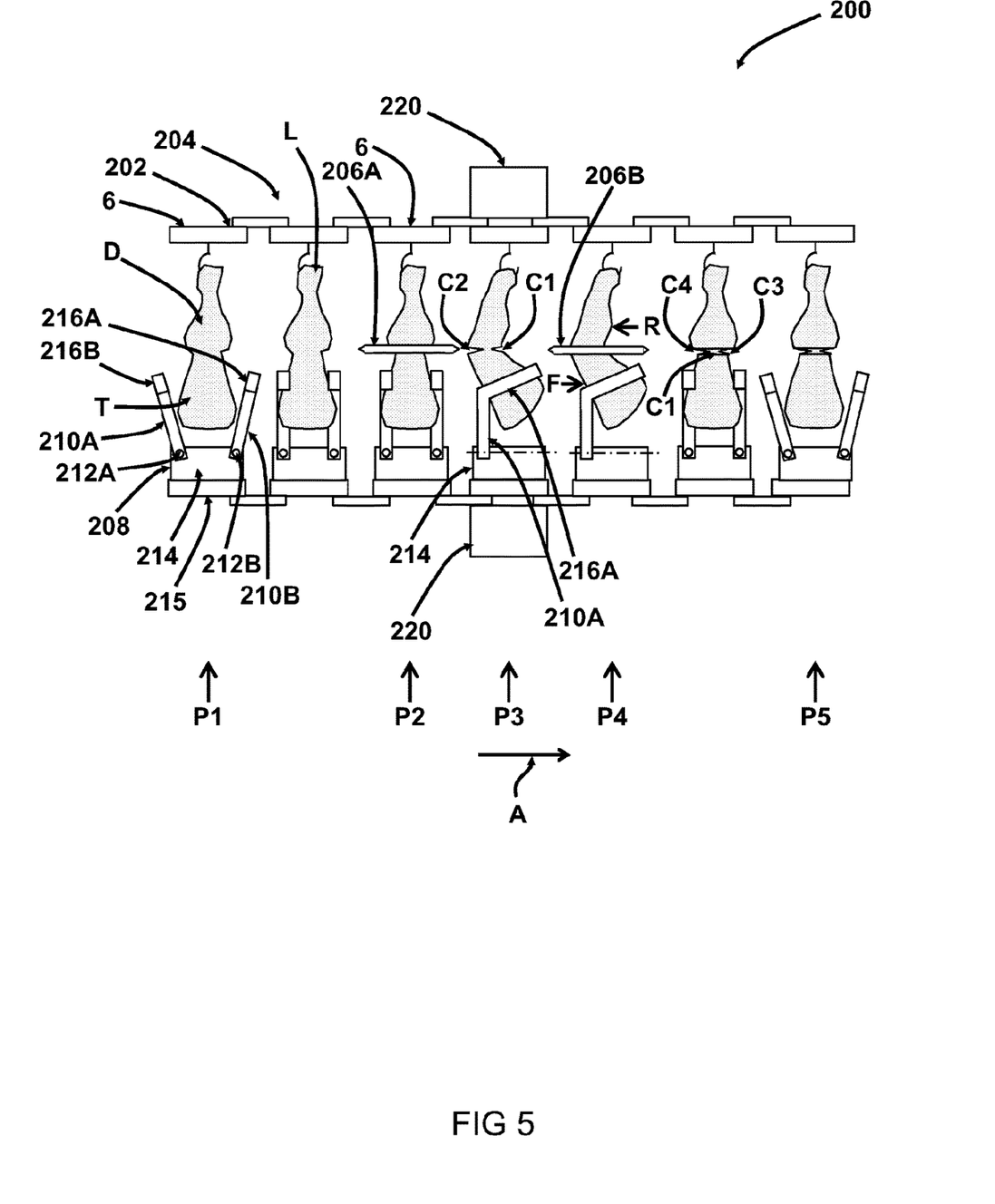
FIG. 5 is a schematic representation of a pre-cutting system.

FIG. 5 shows a schematic example of a pre-cutting system 200, e.g. to be used as the precutting system 106 in FIG. 4. The pre-cutting system 200 is arranged for pre-cutting a poultry leg part, including a femur and a tibia and meat surrounding the bones. Hence, the poultry leg part includes a thigh T and a drumstick D. The system 200 includes a conveying unit 202 arranged for suspending the poultry leg part therefrom, and for transporting the poultry leg part along a conveying path in a conveying direction A. In this example, the poultry legs are suspended from the shackles 6 by the ankle joint. In this example, the conveying unit 202 is an overhead conveying system including a plurality of shackles 6.

The system 200 also includes a pre-cutting unit 204. In this example, the pre-cutting unit 204 includes a first cutting unit 206A arranged for cutting the meat at or near the knee joint. Here, the first cutting unit includes two knives, here rotary knives, for cutting the meat on two opposite sides of the knee. In this example, the pre-cutting unit 204 also includes a second cutting unit 206B arranged for cutting the meat at or near the knee joint. Here, the second cutting unit includes two knives, here rotary knives, for cutting the meat on two opposite sides of the knee.

The precutting unit 204 further includes a grasper 208 arranged for grasping the meat surrounding the femur. In this example, the grasper 208 includes two grasping jaws 210A, 201B arranged to selectively be in a first or a second position. In the first, open, position, the jaws 210A, 210B are spaced apart for receiving or releasing the leg part. In the second, closed, position, the jaws 210A, 210B are closed for maintaining the leg part positioned. Hence, the leg can be maintained properly positioned while cut by the cutting unit 206A or 206B. The grasping jaws 210A, 210B are positioned to grasp the meat surrounding the femur below the knee joint. This allows firm maintaining of the leg part. In this example, the grasping jaws 210A, 210B each are mounted pivotally about a pivot axis 212A, 212B to a base 214.

In this example, the grasping jaws 210A, 210B each include a grasping bar 216A, 216B. The grasping bars 216A, 216B can efficiently maintain the leg part in position. Here, the bars 216A, 216B are substantially parallel in the second position. Hence, a size of the leg part hardly influences the capability of the grasper of maintaining the leg part in position. Also, this way the grasper does not force the leg part to a certain position but allows the leg part to hang naturally from the shackle. In the example of FIG. 5, the grasping bars 216A, 216B are mounted in a non-horizontal position, being lower at the front side F of the leg than at the rear side R of the leg. The inclined grasping bars 216A, 216B allow for efficient grasping of the thigh meat, taking into account the general distribution of meat around the femur.

The grasping jaws 210A, 210B each are pivotally mounted to the base 214. The base 214 is mounted to a grasper conveyor 218 arranged for moving the grasper 208 synchronous with the shackle 6.

The pre-cutting system 200 can be operated as follows. The grasper 208 can be in the open position for receiving the leg part at a receiving position P1. Optionally, the leg part is first provided out of the way of the grasper 208 for avoiding collision with the grasping bars 216A, 216B and moved between the grasping bars 216A, 216B in a direction orthogonal to the conveying direction A until the thigh is between the grasping bars. Then, the grasper is closed, grasping the thigh meat of the leg part. Then, the shackle 6 and the grasper 208 are moved synchronously in the conveying direction A. Hence, the leg part is moved past the first cutting unit 206A at position P2. There, the meat is cut while the grasper 208 is maintained in the closed position. In this example, the first cutting unit 206A makes the opposite first cut C1 and second cut C2. At position P3 a rotation station 220 is placed. At the rotation station 220 both the shackle 6 and the grasper 208 are rotated synchronously. Thereto, the base 214 is rotatably attached to the conveyor 218, e.g. via a block 215. The synchronous rotation ensures that the leg part is maintained in a proper position relative to the shackle. In this example, the leg part is rotated over 90 degrees about the vertical axis. Then, the shackle 6 and the grasper 208 continue synchronous movement in the conveying direction A. Hence, the leg part is moved past the second cutting unit 206B at position P4. There, the meat is cut while the grasper 208 is maintained in the closed position. In this example, the first cutting unit 206A makes the opposite third cut C3 and fourth cut C4. It will be clear that the cuts made by the second cutting unit 206B are, in this example, on the sides not cut by the first cutting unit 206A. Hence, now the leg is cut all around at the knee. At position P5 the grasper 204 is opened again for releasing the leg part. Optionally, the leg part can be moved out of the way of the grasper 208 in a direction orthogonal to the conveying direction A for avoiding collision with the grasping bars 216A, 216B.

It will be appreciated that the movement of the shackle 6 and the grasper 204 in the conveying direction preferably is a continuous movement, without stops. Hence an efficient pre-cutting is obtained. The leg parts can be provided to the pre-cutting system and taken from the pre-cutting system while the shackles and graspers keep moving.

It will be appreciated that in the example of FIG. 5 a height adjustment unit is included for adjusting a height of the shackles so as to align the vertical position of the knee of the leg part to the first and/or second cutting unit. Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the resilient member is arranged for forcing the second carrier away from the third carrier. It is also possible that the resilient member is arranged for forcing the second carrier towards the third carrier. In such case, the third carrier can be positioned above the second carrier.

With respect to the example of FIG. 3 a detailed set of stages is described. It will be appreciated that different orders or numbers of steps may be applied. For example, the thigh is scraped four times before reaching the first cutting unit. It is also possible that the thigh is scraped once, twice, three times, or any suitable number. In the example of FIG. 3, the leg is rotated once between two scraping steps. It will be appreciated that the leg can also be rotated more than once between scraping steps. In FIG. 3 two cutting units are shown. It will be appreciated that other numbers of cutting units are possible as well.

In the examples processing of poultry legs including a thigh and a drumstick is shown. It will be appreciated that the system and method can also be applied to drumsticks, or to thighs. In the examples, only the thigh is deboned. It will be appreciated that it is also possible to debone both the thigh and the drumstick.

In the example of FIGS. 2 and 3, a plurality of guiding plates is provided, together forming the first, second, and third guide channels. It will be appreciated that the shape of the guide channels in the guiding plates can easily be changed according to need. Hence, in a simple manner the first second and third guides can be provided. Thus, the operation of the deboning system can easily be altered, e.g. for deboning drumsticks.

It will be appreciated that instead of, or in addition to guiding plates, the guide channel can also be formed e.g. by using guide channel sections. A guide channel sections can e.g. formed by a u-shaped profile, or e.g. by a set of two (e.g. upper and lower) guiding strips. The guide channel sections can e.g. be adjustably mounted, so as to allow modification of the stripping process by simply realigning one or more of the guide channel sections. However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for deboning a poultry leg part, including at least one bone and meat surrounding the bone, the system including:
    a conveying unit configured for transporting the poultry leg part along a conveying path in a suspended arrangement;
    a deboning unit positioned along the conveying path and including:
        a gripper arranged for gripping the meat surrounding the bone, the gripper being associated with a first carrier;
        a gripper actuator arranged for opening and closing the gripper, the gripper actuator being associated with a second carrier; and
        a gripper tensioner arranged for providing a biasing force for closing the gripper, the gripper tensioner being associated with a third carrier;
        wherein the first, second and third carriers are arranged for displacement relative to a base member, and wherein the base member is moveable in horizontal direction along the conveying path.

2. The system of claim 1, wherein the first, second and third carriers are arranged for displacement in a vertical direction relative to a base member.

3. The system of claim 2, wherein the base member includes a linear guide for guiding the first, second and third carrier in the vertical direction.

4. The system of claim 1, wherein the deboning unit includes a first guide, and the first carrier includes a first follower for following the first guide;
    the deboning unit includes a second guide, and the second carrier includes a second follower for following the second guide; and
    the deboning unit includes a third guide, and the third carrier includes a third follower for following the third guide.

5. The system of claim 4, wherein the first, second and third guides are stationary.

6. The system of claim 4, wherein the first guide comprises a first guide channel, and/or the second guide comprises a second guide channel, and/or the third guide comprises a third guide channel.

7. The system of claim 6, wherein the deboning unit comprises a first guide, a second guide and a third guide, and wherein the second guide comprises a second guide channel including at least one section, and the second follower is moved along the second guide channel to cause the second carrier to vertically move relative to the first and third carriers for transferring the biasing force from the third carrier to the gripper.

8. The system of claim 4, wherein the gripper includes a first jaw and second jaw, wherein the first jaw and the second jaw are rotatable relative to each other and are mounted to the first carrier.

9. The system of claim 8, wherein the gripper actuator includes a first arm connecting the rotatable first jaw to the second carrier, such that a displacement of the second carrier relative to the first carrier rotates the first jaw.

10. The system of claim 9, wherein the gripper actuator includes a second arm connecting the rotatable second jaw to the second carrier, such that displacement of the second carrier relative to the first carrier rotates the second jaw.

11. The system of claim 10, further comprising a resilient member interposed between the second carrier and the third carrier.

12. The system of claim 11, wherein in a first mode, the gripper is in an opened state, and wherein in a second mode, the gripper is biased in a closed position.

13. The system of claim 12, wherein in the second mode, a portion of a biasing force of the resilient member is supported by the third guide and another portion of the biasing force of the resilient member is supported by the gripper, or the leg held by the gripper.

14. The system of claim 12, wherein in a third mode, the gripper is urged in a closed position.

15. The system of claim 14, wherein in the third mode, the biasing force of the resilient member is not applied to the gripper.

16. A system for pre-cutting a poultry leg part, the poultry leg part including a femur and a tibia and meat surrounding the femur and tibia, the system including:
    a conveying unit including at least one shackle arranged for suspending the poultry leg part therefrom from an ankle joint, and for transporting the poultry leg part along a conveying path;
    a pre-cutting unit including:
        a cutting unit arranged along the conveying path and configured for cutting the meat at or near a knee joint of the poultry leg part; and
        a grasper arranged for grasping the meat surrounding the femur, wherein the grasper includes two jaws arranged to be movable between a first and a second position, wherein in their first positions, the jaws are spaced apart for receiving the leg part, and wherein in their second positions, the jaws are closed for maintaining a position of the poultry leg part, wherein the jaws are positioned to grasp the meat surrounding the femur below the knee joint, and wherein the grasper is mounted to a grasper conveyor, configured to move the grasper substantially synchronously with the shackle.

17. The system of claim 16, wherein the jaws each include a grasping bar, wherein the grasping bars are arranged substantially parallel when the jaws are in the second position.

18. A system for processing poultry leg parts, including:
a conveying system configured for moving the poultry leg parts along a conveying path suspended therefrom;
a measurement system arranged along the conveying path and configured for measuring a length of each poultry leg part suspended from the conveying system;
a precutting system, arranged along the conveying path for cutting meat of the poultry leg parts, the precutting system comprising:
a cutting unit arranged along the conveying path;
a grasper having jaws configured to grasp the poultry leg parts and moveable between a first position and a second position; a height adjustment unit for adjusting a height of the poultry leg parts relative to a cutting device precutting system; and
a deboning system positioned along the conveying path and comprising:
a gripper configured to grip meat of the poultry leg part;
a gripper actuator for opening and closing the gripper; and
a gripper tension configured to apply a biasing force for closing the gripper about the meat of the poultry leg part.

19. A method for deboning a poultry leg part, the poultry leg part including at least one bone and meat surrounding the at least one bone, the method including:
suspending and transporting the suspended poultry leg part along a conveying path;
gripping the meat surrounding the at least one bone, with a gripper associated with a first carrier;
closing the gripper around the leg part by moving a gripper actuator associated with a second carrier relative to the first carrier; and
determining a biasing force for closing the gripper by a gripper tensioner associated with a third carrier by moving the third carrier relative to the first carrier.

20. The method of claim 19, wherein the first, second and third carrier are arranged for vertical displacement relative to a base member, and wherein the base member is moveable in a horizontal direction along the conveying path.

21. The method of claim 19, further comprising closing the gripper by moving the second carrier towards the first carrier.

22. The method of claim 19, wherein determining the biasing force includes positioning a resilient member, between the second carrier and the third carrier and biasing the second carrier to actuate the gripper to close.

23. The method of claim 19, further including allowing the second carrier to freely move relative to the first and third carriers for transferring the biasing force from the third carrier to the gripper.

24. The method of claim 23, further including forcing the gripper in a closed position.

25. The method of claim 24, further including, prior to gripping the meat surrounding the at least one bone, precutting the meat surrounding the at least one bone to provide a cut at or near a gripping location.

26. A method for pre-cutting a poultry leg part, including a femur and a tibia and meat surrounding the femur and tibia, including:
a) suspending the poultry leg part from shackles of a conveying unit;
b) receiving the poultry leg part by a grasper while the grasper is in an open position;
c) closing the grasper to grasp the meat surrounding the femur;
d) moving the poultry leg part past a cutting unit, and cutting the meat while the grasper is maintained in the closed position, as the grasper is moved substantially synchronously with the shackle; and
e) opening the grasper for releasing the poultry leg part.

27. The method of claim 26, further including after step d):
f) substantially synchronously rotating both the shackle and the grasper, and
g) moving the poultry leg part past a second cutting unit and cutting the meat while the grasper is maintained in the closed position, while the grasper is moved substantially synchronously with the shackle.

* * * * *